(12) United States Patent
Chang

(10) Patent No.: US 7,100,295 B1
(45) Date of Patent: Sep. 5, 2006

(54) MEASURING DEVICE

(76) Inventor: Pi-Chao Chang, 58, Ma Yuan West St., Taichung (TW)

(*) Notice: Subject to any disclaimer, the term of this patent is extended or adjusted under 35 U.S.C. 154(b) by 0 days.

(21) Appl. No.: 11/135,486

(22) Filed: May 24, 2005

(51) Int. Cl.
*B43L 7/00* (2006.01)

(52) U.S. Cl. ............................ 33/379; 33/1 B; 33/483; 33/494

(58) Field of Classification Search ................. 33/483, 33/494, 534, 566, 562–564, 1 B, 1 AP, 1 N, 33/1 F
See application file for complete search history.

(56) References Cited

U.S. PATENT DOCUMENTS

| | | | | |
|---|---|---|---|---|
| 4,779,346 A * | 10/1988 | Schafer | ........................ | 33/1 B |
| 5,819,422 A * | 10/1998 | Schafer | ........................ | 33/1 B |
| 5,924,213 A * | 7/1999 | Lee | .............................. | 33/494 |
| 6,311,408 B1 * | 11/2001 | Madayag | ..................... | 33/653 |
| 6,434,844 B1 * | 8/2002 | Rank | ........................... | 33/494 |
| 6,658,746 B1 * | 12/2003 | Ganivet | ..................... | 33/1 SB |
| 6,839,971 B1 * | 1/2005 | Schafer et al. | ................ | 33/1 B |
| 6,925,724 B1 * | 8/2005 | Tandy | ........................ | 33/563 |
| 2005/0178013 A1 * | 8/2005 | Schafer et al. | ................ | 33/1 B |

\* cited by examiner

*Primary Examiner*—Yaritza Guadalupe-McCall
(74) *Attorney, Agent, or Firm*—Alan D. Kamrath; Nikolai & Mersereau, P.A.

(57) ABSTRACT

A measuring device includes a square ruler body provided with a plurality of scales, a plurality of marking lines, and a plurality of counting numbers. Each of the counting numbers has a corresponding numeral which is located under the respective the counting number for measurement of different directions. Thus, the measuring device is used to measure the size of the workpiece at any direction and any start point, thereby greatly saving the measuring time and the manual work. In addition, the counting numbers have a two-dimensional corresponding manner so that the measuring device can obtain the size of the workpiece instantaneously from left to right or from right to left without having to rotate or change the direction of the ruler body.

10 Claims, 4 Drawing Sheets

MEASURING DEVICE

BACKGROUND OF THE INVENTION

1. Field of the Invention

The present invention relates to a measuring device, and more particularly to a measuring device for measuring the size of a workpiece to be measured.

2. Description of the Related Art

A conventional ruler is used to measure the size of a workpiece, such as a cloth, a paper pattern or the like. The conventional ruler includes a transparent ruler body made of acrylic material, and a plurality of scales mounted on the ruler body. However, the user has to measure the size from a start point of the scales, thereby wasting the measuring time and the manual work. In addition, the marking lines of the scales are too clear to shelter the user's sight of view, so that the user cannot align the marking lines of the scales exactly. Further, in the metric measuring system, the basis unit of each of the scales is one millimeter (1 mm). Thus, the scales have too many marking lines, so that the scales are made vague and the user cannot distinguish the scales easily, thereby causing inconvenience to the user in measurement of the size of the workpiece.

SUMMARY OF THE INVENTION

The primary objective of the present invention is to provide a measuring device that is used to measure the size of the workpiece at any direction and any start point, thereby saving the measuring time and the manual work.

Another objective of the present invention is to provide a measuring device, wherein the counting numbers on the scales have a two-dimensional corresponding manner so that the measuring device can obtain the size of the workpiece to be measured instantaneously from left to right or from right to left without having to rotate or change the direction of the ruler body.

A further objective of the present invention is to provide a measuring device, wherein the measuring device can obtain the size of the workpiece directly without needing further calculation.

A further objective of the present invention is to provide a measuring device, wherein the vertical line of a specified scale is provided with a line segment marking so that the user can mark the scale quickly, thereby enhancing the measuring velocity and efficiency.

A further objective of the present invention is to provide a measuring device, wherein each of the intersecting points of the horizontal marking lines and the vertical marking lines is indicated by a specified sign and phantom lines so that the marking lines produce an extended and concentrated effect to present an outstanding appearance, thereby preventing the marking lines from sheltering the user's sight of view, and thereby facilitating the user aligning each of the intersecting points of the marking lines exactly.

Further benefits and advantages of the present invention will become apparent after a careful reading of the detailed description with appropriate reference to the accompanying drawings.

DETAILED DESCRIPTION OF THE INVENTION

Figure 1:
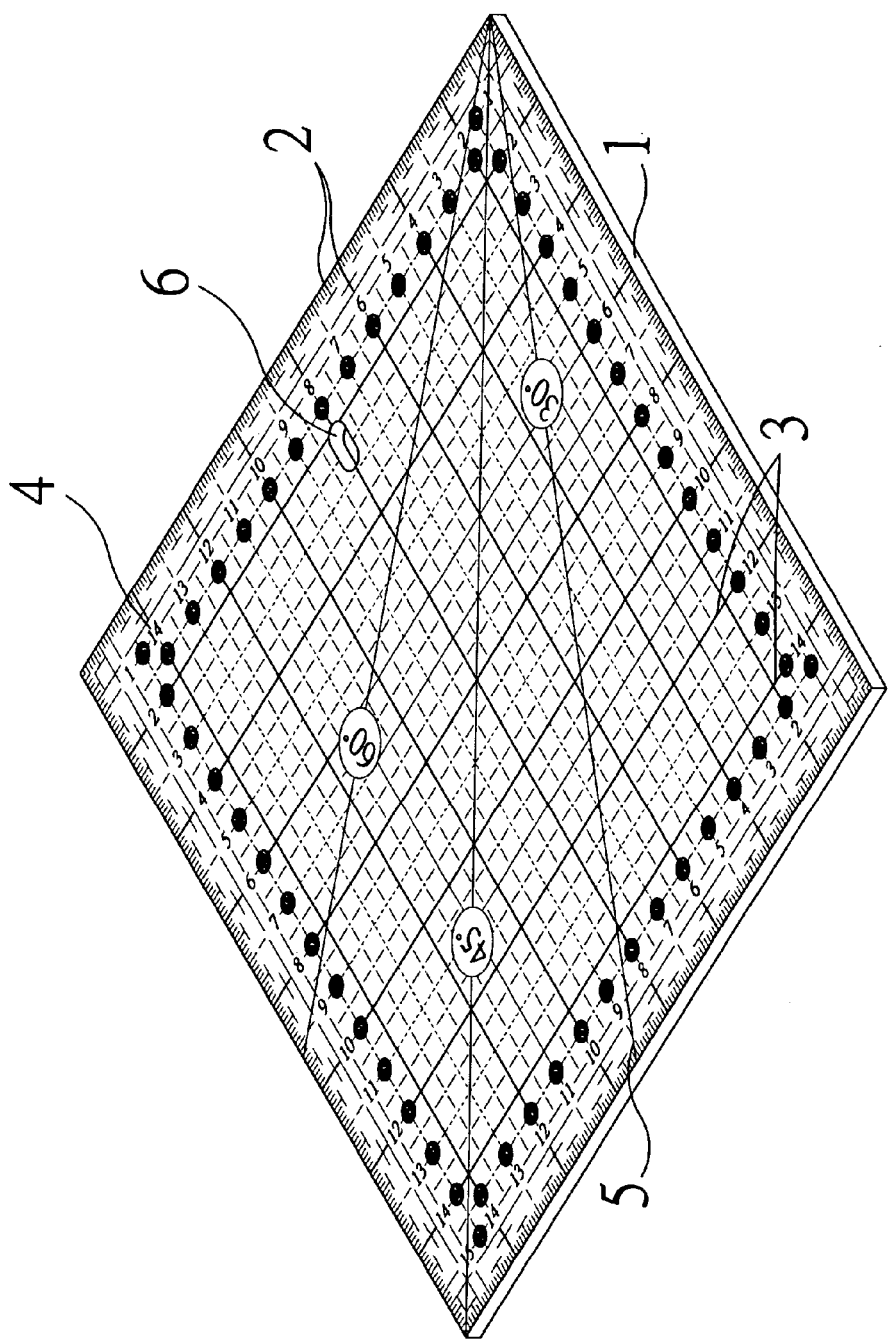
FIG. 1 is a perspective view of a measuring device in accordance with the preferred embodiment of the present invention.
Figure 2:
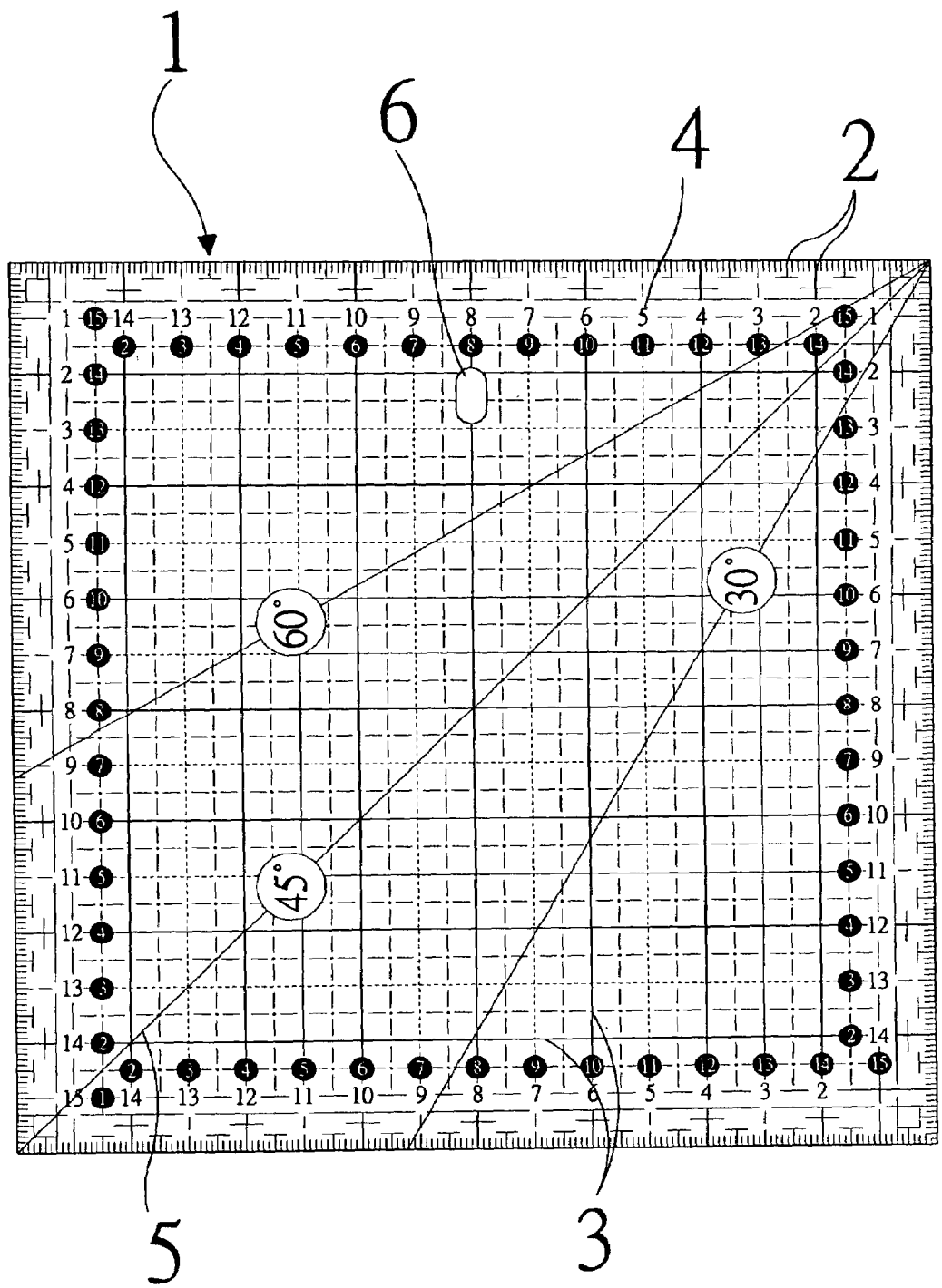
FIG. 2 is a plan view of the measuring device as shown in FIG. 1, wherein the measuring device has a metric measuring system.
Figure 3:
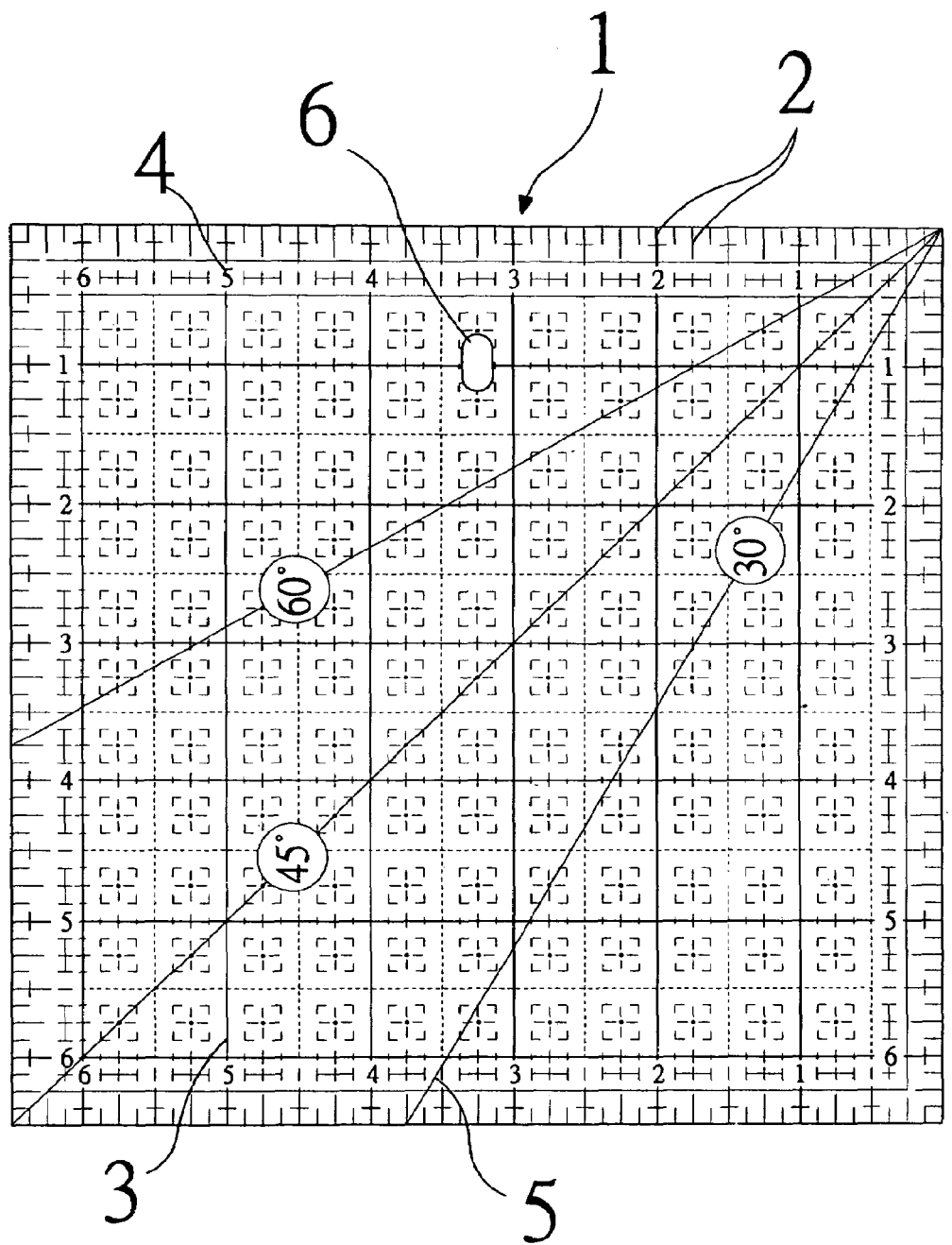
FIG. 3 is a plan view of the measuring device as shown in FIG. 1, wherein the measuring device has a British measuring system.

Referring to the drawings and initially to FIGS. 1–3, a measuring device in accordance with the preferred embodiment of the present invention comprises a transparent square ruler body 1 made of acrylic material. The ruler body 1 is provided with a plurality of scales 2, a plurality of marking lines 3, and a plurality of counting numbers 4. In the metric measuring system as shown in FIG. 2, the basis unit of each of the scales 2 is one millimeter (1 mm), and in the British measuring system as shown in FIG. 3, the basis unit of each of the scales 2 is one eighth inch (⅛ in). The marking lines 3 are extended along a surface of the ruler body 1 on the basis of the scales 2. Each of the counting numbers 4 indicates the unit of the centimeter or the inch. Thus, the scales 2, the marking lines 3 and the counting numbers 4 are used to provide a measurement exactly. The ruler body 1 is additionally provided with three angle lines 5 to indicate the angles of thirty degrees (30°), sixty degrees (60°) and ninety degrees (90°) respectively so as to measure the angle of a workpiece. The ruler body 1 has an upper side formed with a hanging hole 6 for hanging the ruler body 1.

In the preferred embodiment of the present invention, the counting numbers 4 on the scales 2 have a two-dimensional corresponding manner and adopt two measuring units, including the metric measuring system (such as 16 cm) and the British measuring system (such as 16 in). The counting numbers 4 are numbered from one to fifteen (1–15) and arranged from left to right, wherein each of the counting numbers 4 has a corresponding numeral which is located under the respective the counting number 4 for measurement of different directions. For example, one (1) is corresponding to fifteen (15), two (2) is corresponding to fourteen (14), three (3) is corresponding to thirteen (13), etc., and fifteen (15) is corresponding to one (1). Thus, the measuring device can obtain the size of the workpiece to be measured instantaneously from left to right or from right to left without having to rotate or change the direction of the ruler body 1. In addition, the measuring device can obtain the size of the workpiece to be measured directly without needing further calculation.

In addition, in the metric measuring system as shown in FIG. 2, the vertical line of a specified scale 2 (such as the scale 2 of every 0.3 cm, 0.5 cm and 0.7 cm) is provided with a line segment marking so that the user can mark the scale 2 quickly without having to obtain the scale 2 by in turn calculating every one millimeter (1 mm), thereby enhancing the measuring velocity and efficiency.

Figure 4:
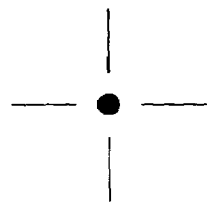
FIG. 4 is a schematic locally enlarged view of the measuring device as shown in FIG. 2.

Referring to FIG. 4, in the metric measuring system as shown in FIG. 2, the horizontal and vertical marking lines 3 have multiple intersecting points, and each of the intersecting points of the horizontal marking lines 3 of every 0.5 mm interval and the vertical marking lines 3 of every 0.5 mm interval is indicated by a sign including a cross (+) and a circular point (●) located at a center of the cross. In addition, each of the intersecting points of the marking lines 3 is indicated by phantom lines so that the marking lines 3 produce an extended and concentrated effect to present an outstanding appearance, thereby preventing the marking lines 3 from sheltering the user's sight of view, and thereby facilitating the user aligning each of the intersecting points of the marking lines 3 exactly.

Figure 5:
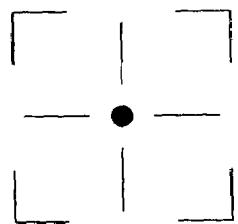
FIG. 5 is a schematic locally enlarged view of the measuring device as shown in FIG. 3.

Referring to FIG. 5, in the British measuring system as shown in FIG. 3, the horizontal and vertical marking lines 3 have multiple intersecting points, and each of the intersecting points of the horizontal marking lines 3 of every ¼ inch interval and the vertical marking lines 3 of every ¼ inch interval is indicated by a sign including a cross (+) located in a square (□) and a circular point (●) located at a center of the cross. In addition, each of the intersecting points of the marking lines 3 is indicated by phantom lines so that the marking lines 3 produce an extended and concentrated effect to present an outstanding appearance, thereby preventing the marking lines 3 from sheltering the user's sight of view, and thereby facilitating the user aligning each of the intersecting points of the marking lines 3 exactly.

Accordingly, the counting numbers 4 on the scales 2 have a two-dimensional corresponding manner so that the measuring device can obtain the size of the workpiece to be measured instantaneously from left to right or from right to left without having to rotate or change the direction of the ruler body 1. In addition, the measuring device can obtain the size of the workpiece directly without needing further calculation. Further, the measuring device is used to measure the size of the workpiece at any direction and any start point, thereby saving the measuring time and the manual work. Further, the vertical line of a specified scale 2 is provided with a line segment marking so that the user can mark the scale 2 quickly, thereby enhancing the measuring velocity and efficiency. Further, each of the intersecting points of the horizontal marking lines 3 and the vertical marking lines 3 is indicated by a specified sign and phantom lines so that the marking lines 3 produce an extended and concentrated effect to present an outstanding appearance, thereby preventing the marking lines 3 from sheltering the user's sight of view, and thereby facilitating the user aligning each of the intersecting points of the marking lines 3 exactly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A measuring device, comprising a transparent square ruler body provided with a plurality of scales, a plurality of marking lines, and a plurality of counting numbers, wherein:
    each of the counting numbers has a corresponding numeral which is located under the respective the counting number for measurement of different directions;
    the marking lines have multiple intersecting points in a metric measuring system, and each of the intersecting points of horizontal marking lines of every 0.5 mm interval and vertical marking lines of every 0.5 mm interval is indicated by a sign including a cross (+) and a circular point (●) located at a center of the cross.

2. The measuring device in accordance with claim 1, wherein the marking lines are extended along a surface of the ruler body on the basis of the scales.

3. The measuring device in accordance with claim 1, wherein the ruler body is provided with three angle lines to indicate the angles of thirty degrees (30°), sixty degrees (60°) and ninety degrees (90°) respectively.

4. The measuring device in accordance with claim 1, wherein the ruler body has an upper side formed with a hanging hole for hanging the ruler body.

5. The measuring device in accordance with claim 1, wherein the counting numbers have a two-dimensional corresponding manner.

6. The measuring device in accordance with claim 1, wherein the counting numbers adopt two measuring units, including the metric measuring system and the British measuring system.

7. The measuring device in accordance with claim 1, wherein the vertical line of a specified scale is provided with a line segment marking in a metric measuring system.

8. The measuring device in accordance with claim 1, wherein each of the intersecting points of the marking lines is indicated by phantom lines so that the marking lines produce an extended and concentrated effect to present an outstanding appearance.

9. A measuring device, comprising a transparent square ruler body provided with a plurality of scales, a plurality of marking lines, and a plurality of counting numbers, wherein:
    each of the counting numbers has a corresponding numeral which is located under the respective the counting number for measurement of different directions;
    the marking lines have multiple intersecting points in a British measuring system, and each of the intersecting points of horizontal marking lines of every ¼ inch interval and vertical marking lines of every ¼ inch interval is indicated by a sign including a cross (+) located in a square (□) and a circular point (●) located at a center of the cross.

10. The measuring device in accordance with claim 9, wherein each of the intersecting points of the marking lines is indicated by phantom lines so that the marking lines produce an extended and concentrated effect to present an outstanding appearance.

* * * * *